United States Patent
Doumae et al.

(10) Patent No.: US 8,823,995 B2
(45) Date of Patent: Sep. 2, 2014

(54) IMAGE DATA PROCESSING DEVICE AND IMAGE READING APPARATUS

(71) Applicant: PFU Limited, Kahoku (JP)

(72) Inventors: Keisuke Doumae, Kahoku (JP); Akira Iwayama, Kahoku (JP); Hirotake Shinde, Kahoku (JP)

(73) Assignee: PFU Limited, Kahoku-shi (JP)

(*) Notice: Subject to any disclaimer, the term of this patent is extended or adjusted under 35 U.S.C. 154(b) by 0 days.

(21) Appl. No.: 13/950,693

(22) Filed: Jul. 25, 2013

(65) Prior Publication Data

US 2014/0085679 A1 Mar. 27, 2014

(30) Foreign Application Priority Data

Sep. 27, 2012 (JP) ................. 2012-214760

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC .............. *G06K 15/00* (2013.01); *G06F 3/1296* (2013.01)
USPC ......................... 358/1.16; 358/1.15

(58) Field of Classification Search
CPC .............................. G06K 15/00; G06F 3/1296
USPC ......................... 358/1.1, 1.16, 1.15
See application file for complete search history.

(56) References Cited

U.S. PATENT DOCUMENTS

| 8,638,460 | B2* | 1/2014 | Shima .......................... 358/1.15 |
| 2005/0248584 | A1 | 11/2005 | Takeo et al. |
| 2009/0303549 | A1 | 12/2009 | Sakai |
| 2010/0123923 | A1* | 5/2010 | Katoh et al. ................. 358/1.15 |

FOREIGN PATENT DOCUMENTS

| JP | 2005-323159 | 11/2005 |
| JP | 2009-296352 | 12/2009 |

* cited by examiner

*Primary Examiner* — Douglas Tran
(74) *Attorney, Agent, or Firm* — Christie, Parker & Hale, LLP

(57) ABSTRACT

An image data processing device includes a first integrated circuit, a second integrated circuit, and a third integrated circuit. The first integrated circuit includes a first image processing circuit for first image processing for image data in a first memory, and a first serial interface for direct memory access transfer between the first memory and a third memory. The second integrated circuit includes a second image processing circuit for second image processing for image data in a second memory, and a second serial interface for direct memory access transfer between the second memory and the third memory. The third integrated circuit includes a third image processing circuit for third image processing for image data in the third memory, and a third serial interface for direct memory access transfer between the third memory and the first memory, and between the third memory and the second memory.

7 Claims, 11 Drawing Sheets

IMAGE DATA PROCESSING DEVICE AND IMAGE READING APPARATUS

CROSS-REFERENCE TO RELATED APPLICATIONS

This application is based upon and claims the benefit of priority of prior Japanese Patent Application No. 2012-214760, filed on Sep. 27, 2012, the entire contents of which are incorporated herein by reference.

FIELD

Embodiments illustrated herein relates to an image data processing device including a plurality of image processing circuits, and to an image reading apparatus including such an image data processing device.

BACKGROUND

A known example of an image processing device including a plurality of image processing means is an image processing device including a first image processing means for processing an image read by a first image reading means, a second image processing means for processing an image read by a second image reading means, a storage means that stores the images processed by the first image processing means and the second image processing means and a memory control means that controls access of the storage means. The first image processing means, and the second image processing means are connected to the memory control means by a bus switch, and a band between the bus switch and the memory control means is equal to or greater than the total band between the first image processing means and the bus switch, and between the second image processing means and the bus switch.

Furthermore, an image system is known in which a plurality of image processing units, a scanner, and a printer as end points for a PCI Express standard switch are connected by means of a PCI Express standard high-speed serial interface.

Related art is disclosed in Japanese Laid-open Patent Publications No. 2009-296352 and No. 2005-323159.

SUMMARY

When there are a plurality of image data items to be processed, the processing time can be shortened by providing a plurality of integrated circuits that process each of the image data items and by causing the integrated circuits to operate at the same time in a parallel manner. However, processing a plurality of image data items by means of a plurality of integrated circuits has the following problems.

(1) There are cases where additional image processing is carried out in addition to image processing, with respect to each of the plurality of image data items. An example of additional image processing is processing to generate image data of a second image format that is different from a first image format, carried out in addition to processing to generate image data of the first image format from original image data. When this image processing is executed sequentially by the same integrated circuit, the processing time might increase due to the additional image processing and that the processing capacity might decrease.

(2) The plurality of integrated circuits access shared memory in which the plurality of image data items are stored, and there the processing capacity might decrease due to the concentration in memory access.

A device, and apparatus disclosed in the present specification is intended to solve at least one of the above-described problems.

In accordance with an aspect of the embodiment, there is provided an image data processing device including a first integrated circuit, a second integrated circuit, a third integrated circuit, a first memory capable of being accessed by the first integrated circuit, a second memory capable of being accessed by the second integrated circuit, and a third memory capable of being accessed by the third integrated circuit, wherein the first integrated circuit includes a first image processing circuit capable of read and write processing of image data to the first memory, and first image processing for image data stored in the first memory, and a first serial interface capable of direct memory access transfer of image data between the first memory and the third memory, and wherein the second integrated circuit includes a second image processing circuit capable of read and write processing of image data to the second memory, and second image processing for image data stored in the second memory, and a second serial interface capable of direct memory access transfer of image data between the second memory and the third memory, and wherein the third integrated circuit includes a third image processing circuit capable of read and write processing of image data to the third memory, and third image processing for image data stored in the third memory, and a third serial interface capable of direct memory access transfer of image data between the third memory and the first memory and between the third memory and the second memory.

In accordance with another aspect of the embodiment, there is provided an image reading apparatus including an image data processing device, and an image sensor for capturing image data to be processed by the image data processing device. The image data processing device including a first integrated circuit, a second integrated circuit, a third integrated circuit, a first memory capable of being accessed by the first integrated circuit, a second memory capable of being accessed by the second integrated circuit, and a third memory capable of being accessed by the third integrated circuit, wherein the first integrated circuit includes a first image processing circuit capable of read and write processing of image data to the first memory, and first image processing for image data stored in the first memory, and a first serial interface capable of direct memory access transfer of image data between the first memory and the third memory, and wherein the second integrated circuit includes a second image processing circuit capable of read and write processing of image data to the second memory, and second image processing for image data stored in the second memory, and a second serial interface capable of direct memory access transfer of image data between the second memory and the third memory, and wherein the third integrated circuit includes a third image processing circuit capable of read and write processing of image data to the third memory, and third image processing for image data stored in the third memory, and a third serial interface capable of direct memory access transfer of image data between the third memory and the first memory and between the third memory and the second memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
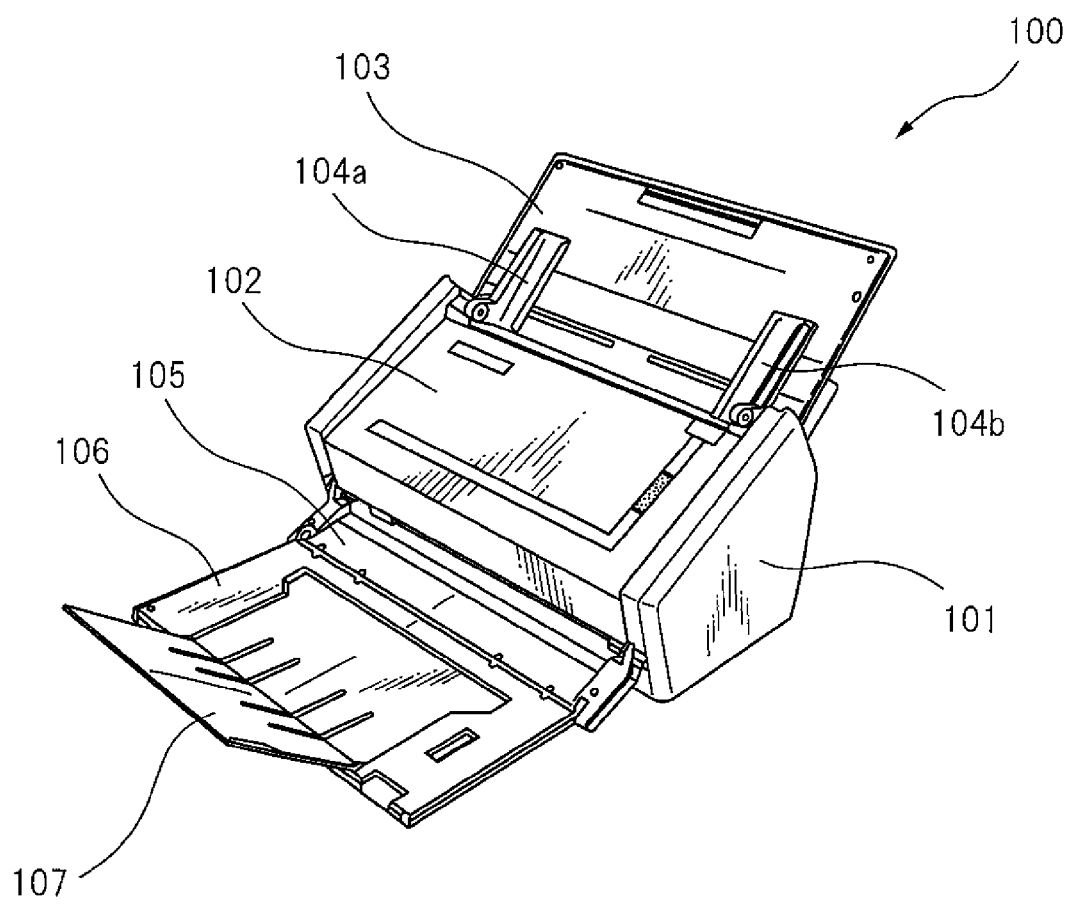
FIG. 1 is a perspective view of an example of an image reading apparatus 100 according to an embodiment.

An image data processing device and an image reading apparatus according to one aspect of the embodiment are hereafter described with reference to the appended drawings. FIG. 1 is a perspective view of an example of an image reading apparatus according to an embodiment, configured as an image scanner. It is to be noted that the technical scope of the present invention is not restricted to these modes of embodiment, and extends to the inventions disclosed in the patent claims and to items that are equivalent thereto.

The image reading apparatus 100 has a casing 101, an upper surface section 102, a document tray 103, a front surface cover 105, an upper surface cover 106, and an auxiliary cover 107 and so on.

The casing 101 forms the outer shape of the image reading apparatus 100, together with the upper surface section 102, the document tray 103, the front surface cover 105, the upper surface cover 106, and the auxiliary cover 107. The upper surface section 102 is arranged in a position covering the upper surface of the image reading apparatus 100, and is joined to the casing 101 by means of a hinge so as to be able to open and close if a document becomes stuck or when the inside of the image reading apparatus 100 is cleaned and so on.

Figure 2:
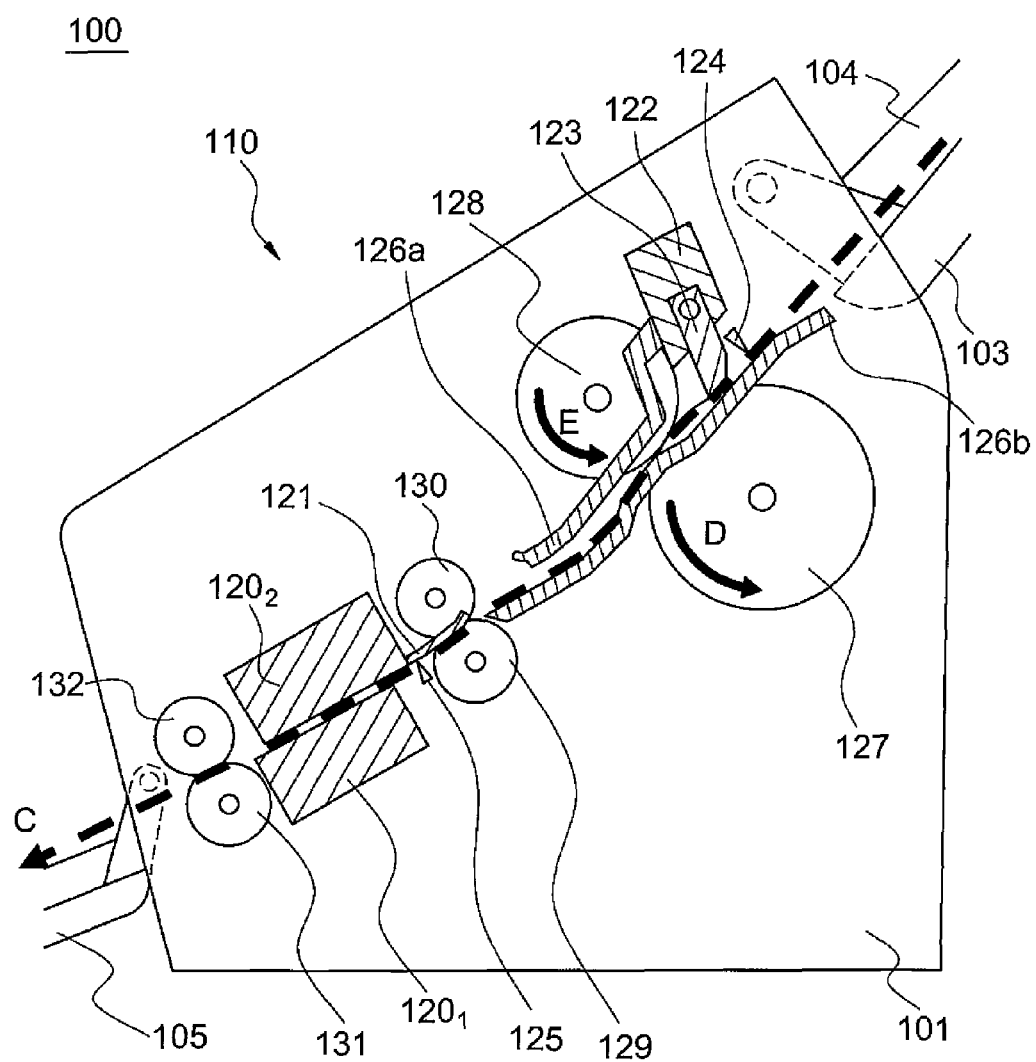
FIG. 2 is a drawing for illustrating a conveyance mechanism 110 of the image reading apparatus 100.

The document tray 103 is rotatably joined to the casing 101 by means of a hinge, and when the image reading apparatus 100 is not being used, the document tray 103 is arranged in a position covering the upper surface section 102, the upper surface cover 106, and the auxiliary cover 107 and functions as an exterior cover. However, when the image reading apparatus 100 is being used as depicted in FIG. 2, the document tray 103 extends outward in such a way that a document can be placed thereon. The document tray 103 is provided with document guides 104a and 104b that can slide in the left-right direction with respect to the document conveyance direction.

The front surface cover 105 is joined to the casing 101 in such a way as to be able to rotate by means of a hinge. The upper surface cover 106 is connected to the front surface cover 105 at one end side, and is connected to the auxiliary cover 107 at the other end side. The auxiliary cover 107 extends outward from the upper surface cover 106 to hold a document if needed.

FIG. 2 is a drawing for illustrating a conveyance mechanism of the image reading apparatus 100.

In FIG. 2 arrow C indicates the conveyance path of a document. The conveyance mechanism 110 has a first imaging unit $120_1$, a second imaging unit $120_2$, a set guide 122, a flap 123, a first document detection unit 124, a second document detection unit 125, an upper guide 126a, and a lower guide 126b. Furthermore, the conveyance mechanism 110 has a paper feed roller 127, a retard roller 128, a first conveyance roller 129, a first driven roller 130, a second conveyance roller 131, and a second driven roller 132. Furthermore, the conveyance mechanism 110 has a motor or the like for driving the paper feed roller 127, the retard roller 128, the first conveyance roller 129, and the second conveyance roller 131.

The first imaging unit $120_1$ has an imaging sensor including a CMOS (complementary metal oxide semiconductor) imaging element, and reads information of the front surface of a document and generates an image signal. Similarly, the second imaging unit $120_2$ has an imaging sensor including a CMOS imaging element, and reads information of the rear surface of a document and generates an image signal. The first imaging unit $120_1$ includes an imaging-unit guide 121 for guiding a document between the first imaging unit $120_1$ and the second imaging unit $120_2$. It is to be noted that a CCD (charge-coupled device) imaging element can be used instead of a CMOS imaging element. The imaging sensors of the first imaging unit $120_1$ and the second imaging unit $120_2$ are examples of image sensors.

The set guide 122 includes the flap 123, which makes contact with the tip end of a document placed on the document tray 103. The first document detection unit 124 has a sensor arranged at the upstream side of the set guide 122, and detects whether or not a document is placed on the document tray 103. The second document detection unit 125 has a sensor arranged at the upstream side of the first imaging unit $120_1$ and the second imaging unit $120_2$, and detects whether or not there is a document at the upstream side of the first imaging unit $120_1$ and the second imaging unit $120_2$.

First, a document to be conveyed is placed on the document tray 103. The tip end of the document comes into contact with and is held by the flap 123 of the set guide 122. At this time, the flap 123 is fixed by a locking means that is not depicted. When conveyance starts, the fixed state of the flap 123 implemented by the locking means is released, and it is possible for the flap 123 to swing. When it is possible for the flap 123 to swing, the document moves due to its own weight to a position where the document makes contact with the paper feed roller 127.

When the paper feed roller 127 rotates in the direction of arrow D, the document is fed between the upper guide 126a and the lower guide 126b. It is to be noted that the retard roller 128 rotates in the direction of arrow E. Therefore, when a plurality of documents are placed on the document tray 103, the conveyance of documents other than the document in contact with the paper feed roller 127 is restricted, and multiple feed of documents is prevented.

The document, while being guided by the imaging-unit guide 121, is fed between the first imaging unit $120_1$ and the second imaging unit $120_2$ by the first conveyance roller 129 and the first driven roller 130. The document that is read by the first imaging unit $120_1$ and the second imaging unit $120_2$ is discharged onto the front surface cover 105, the upper surface cover 106, and the auxiliary cover 107 by the second conveyance roller 131 and the second driven roller 132.

Figure 3:
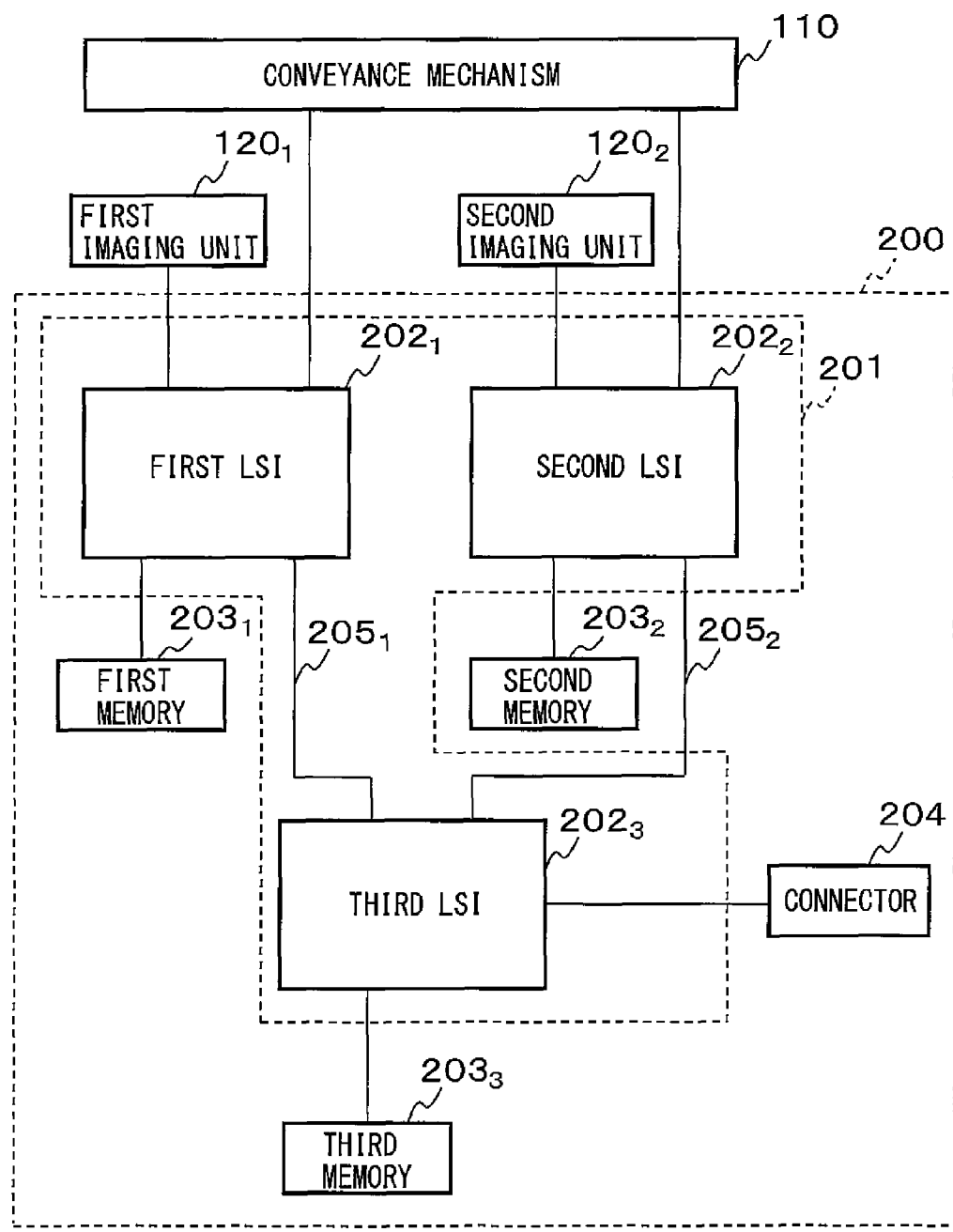
FIG. 3 is a drawing for illustrating an example of a hardware configuration of the image reading apparatus 100.

FIG. 3 is a drawing for illustrating an example of a hardware configuration of the image reading apparatus 100. The image reading apparatus 100 includes the image data processing device 200 in addition to the aforementioned configuration. The image data processing device 200 is an electronic circuit having integrated circuits that process image data generated by the first imaging unit $120_1$ and the second imaging unit $120_2$. The image data processing device 200 includes an electronic circuit 201, first memory $203_1$, second memory $203_2$, third memory $203_3$, and a connector 204.

The electronic circuit 201 includes a first LSI (large-scale integration) $202_1$, a second LSI $202_2$, and a third LSI $202_3$ each having the same configuration. The first LSI $202_1$ writes, to the first memory $203_1$, original image data of the front surface of the document read in from the first imaging unit $120_1$. In the following description, the original image data of the front surface of the document is sometimes referred to as first image data.

The first LSI $202_1$ generates second image data by carrying out first image processing on the first image data stored in the first memory $203_1$. The first image processing may be, for example, processing to convert the first image data into an image having a first image format that is different from the original image format. The first image processing may be, for example, image compression processing, and the second image data may be a compressed image of the first image data. The first image processing may also be other image processing. The first LSI $202_1$ writes the second image data to the first memory $203_1$, separate from the first image data.

The second LSI $202_2$ writes, to the second memory $203_2$, original image data of the rear surface of the document read in from the second imaging unit $120_2$. In the following description, the original image data of the rear surface of the document is sometimes referred to as third image data.

The second LSI $202_2$ generates fourth image data by carrying out first image processing on the third image data stored in the second memory $203_2$. For example, the fourth image data may be a compressed image of the third image data. The second LSI $202_2$ writes the fourth image data to the second memory $203_2$, separate from the third image data.

The third LSI $202_3$ is connected to the first LSI $202_1$ and the second LSI $202_2$ by buses $205_1$ and $205_2$, respectively. In the present exemplary embodiment, for example, a PCI (Peripheral Component Interconnect)-Express bus may be used, or a bus of another standard may be used.

The third LSI $202_3$ and the first LSI $202_1$ transfer, to the third memory $203_3$, the first image data and the second image data stored in the first memory $203_1$, by means of DMA (direct memory access) transfer via the bus $205_1$. The third LSI $202_3$ and the second LSI $202_2$ transfer, to the third memory $203_3$, the third image data and the fourth image data stored in the second memory $203_2$, by means of DMA transfer via the bus $205_2$.

The third LSI $202_3$ carries out second image processing on the first image data and the third image data stored in the third memory $203_3$, and thereby respectively generates fifth image data and sixth image data therefrom. The second image processing may be, for example, processing to convert the first image data and the third image data into an image having a second image format that is different from the original image format.

The second image processing may be binarization processing for example, and the fifth image data and the sixth image data may be binarized images of the first image data and the third image data, respectively. The second image processing also may be other image processing. The third LSI $202_3$ outputs the second image data, the fourth image data, the fifth image data, and the sixth image data from the connector 204.

It is to be noted that the electronic circuit 201 may be a SiP (system-in-package) in which the first LSI $202_1$, the second LSI $202_2$, and the third LSI $202_3$ are housed in the same package. Furthermore, the electronic circuit 201 may be a SoC (system-on-a-chip) in which the first LSI $202_1$, the second LSI $202_2$, and the third LSI $202_3$ are integrated on the same semiconductor chip.

The first memory $203_1$ to the third memory $203_3$ are memories that can be individually accessed by the first LSI $202_1$ to the third LSI $202_3$, respectively. The first memory $203_1$ to the third memory $203_3$ may be DDR-SDRAM (double data rate synchronous dynamic random-access memory), for example. In the first memory $203_1$, storage capacity is prepared having the size that is expected for first image data and second image data of at least two single-sided surfaces of the document (in other words, two items of first image data and two items of second image data). Similarly, in the second memory $203_2$, storage capacity is prepared having the size that is expected for third image data and fourth image data of at least two single-sided surfaces of the document (in other words, two items of third image data and two items of fourth image data).

Figure 4:
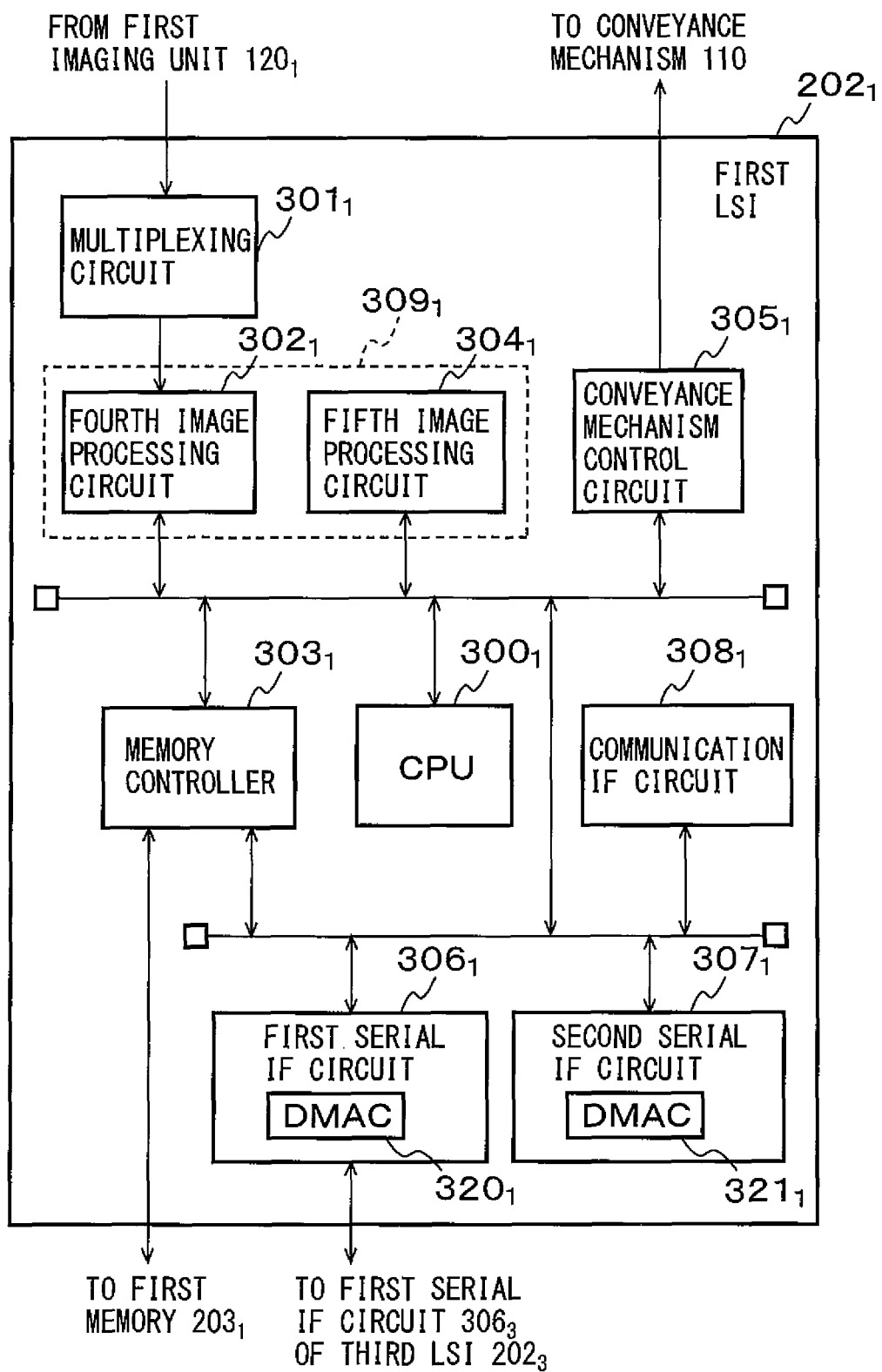
FIG. 4 is a drawing for illustrating an example of a configuration of a first LSI $202_1$.

FIG. 4 is a drawing for illustrating an example of a configuration of the first LSI $202_1$. The first LSI $202_1$ includes a CPU (central processing unit) $300_1$, a multiplexing circuit $301_1$, a first image processing circuit $309_1$, a memory controller $303_1$, and a conveyance mechanism control circuit $305_1$. Furthermore, the first LSI $202_1$ includes a first serial interface circuit $306_1$, a second serial interface circuit $307_1$, and a communication interface circuit $308_1$. The first image processing circuit $309_1$ includes a fourth image processing circuit $302_1$, and a fifth image processing circuit $304_1$. The first LSI $202_1$ may be a SoC in which these constituent elements $300_1$ to $309_1$ are integrated on the same semiconductor chip. It is to be noted that an interface is sometimes referred to as an "IF" in the following description and the appended drawings.

The CPU $300_1$ controls the operations of the units $301_1$ to $308_1$ inside the first LSI $202_1$. The multiplexing circuit $301_1$ multiplexes image signals of the front surface of a document that are output from the first imaging unit $120_1$ and inputs the multiplexed image signals to the fourth image processing circuit $302_1$. For example, the multiplexing circuit $301_1$ may be an FPD-Link (Flat Panel Display Link) chipset. The multiplexing circuit $301_1$ converts image signals output from the first imaging unit $120_1$ into an FPD-Link format serial signal and inputs this signal into the fourth image processing circuit $302_1$.

The fourth image processing circuit $302_1$ stores, in the first memory $203_1$, first image data obtained from the image signal received from the multiplexing circuit $301_1$. The fourth image processing circuit $302_1$ may carry out predetermined image processing on the first image data. This predetermined image processing may be, for example, shading processing, gamma correction processing, or clipping processing to cut out a document region by removing a background region. Furthermore, part of or the entirety of this image processing may be carried out by the fifth image processing circuit $304_1$. The memory controller $303_1$ controls the write operation of data to the first memory $203_1$ and the read operation of data from the first memory $203_1$.

The fifth image processing circuit $304_1$ generates second image data by carrying out first image processing on the first image data stored in the first memory $203_1$. The fifth image processing circuit $304_1$ writes the second image data to the first memory $203_1$, separate from the first image data.

The conveyance mechanism control circuit $305_1$ generates a drive signal for conveying a document by driving the conveyance mechanism 110, in accordance with an instruction from the CPU $300_1$.

The first serial IF circuit $306_1$ is, for example, a PCI-Express interface or other interface circuit, and carries out serial communication processing between the first LSI $202_1$ and the third LSI $202_3$. The first serial IF circuit $306_1$ cooperates with a first serial IF circuit $306_3$ of the third LSI $202_3$ which is described hereafter, to carry out DMA transfer to transfer the first image data and the second image data from the first memory $203_1$ to the third memory $203_3$. The first serial IF circuit $306_1$ includes a DMA controller $320_1$ for controlling the DMA transfer. A DMA controller is sometimes referred to as a "DMAC" in the following description and the appended drawings.

The second serial IF circuit $307_1$ is an interface circuit having the same configuration as the first serial IF circuit $306_1$, and includes a DMAC $321_1$. In the operations described in the present specification, the second serial IF circuit $307_1$ is not used, and a description with respect to the second serial IF circuit $307_1$ is therefore omitted. The second serial IF circuit $307_1$ may be used in other operations of the image data processing device 200 that are not mentioned in the present specification.

The communication IF circuit $308_1$ is an interface circuit for carrying out communication processing between the first LSI $202_1$ and a device external to the image data processing device 200. In the operations described in the present specification, the communication IF circuit $308_1$ is not used The communication IF circuit $308_1$ may be used in other operations of the image data processing device 200 that are not mentioned in the present specification.

Figure 5:
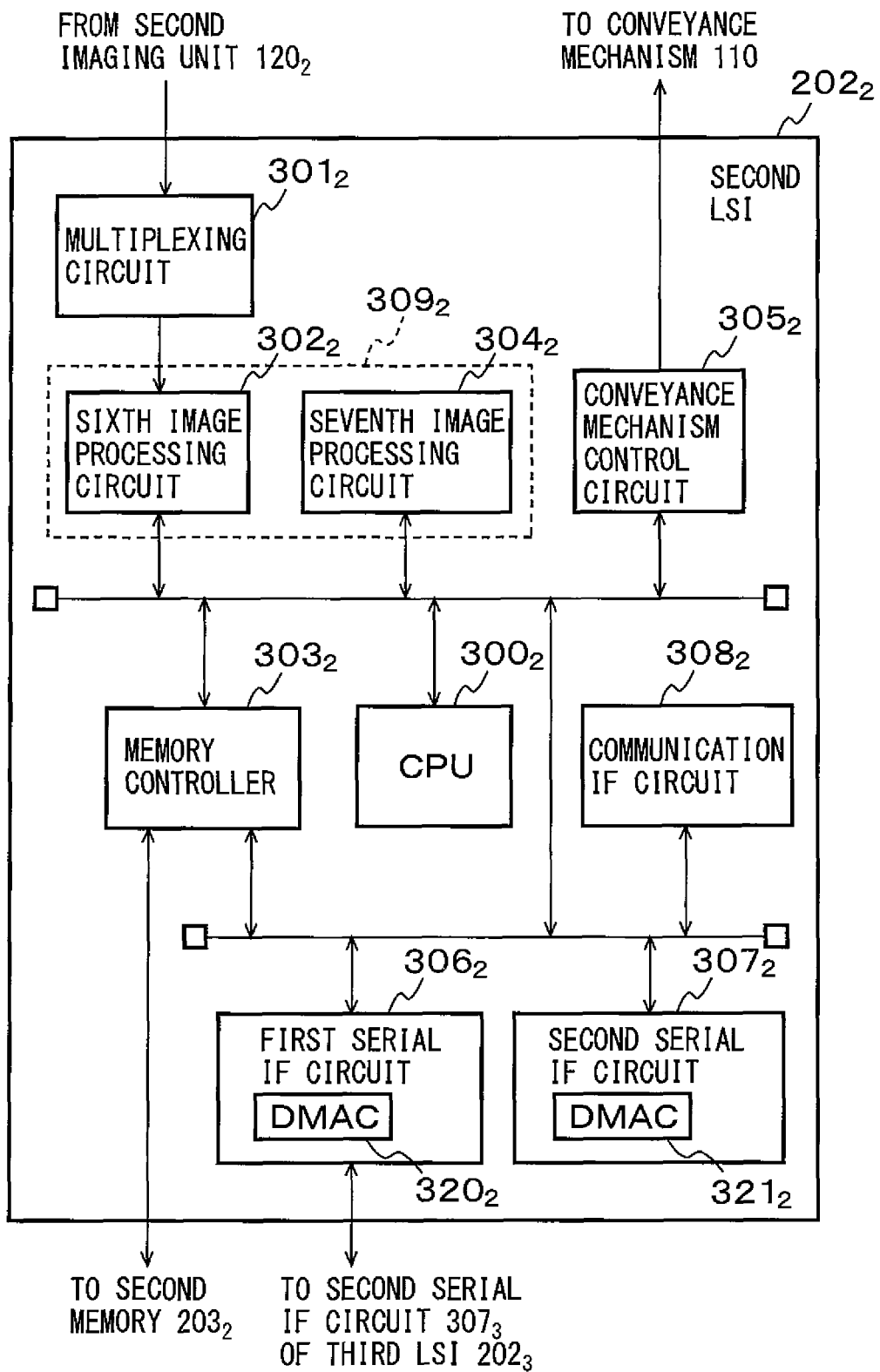
FIG. 5 is a drawing for illustrating an example of a configuration of a second LSI $202_2$.

FIG. 5 is a drawing for illustrating an example of a configuration of the second LSI $202_2$. The second LSI $202_2$ includes a CPU $300_2$, a multiplexing circuit $301_2$, a second image processing circuit $309_2$, a memory controller $303_2$, and a conveyance mechanism control circuit $305_2$. Furthermore, the second LSI $202_2$ includes a first serial IF circuit $306_2$, a second serial IF circuit $307_2$, and a communication IF circuit $308_2$. The second image processing circuit $309_2$ includes a sixth image processing circuit $302_2$, and a seventh image processing circuit $304_2$.

The configurations of the CPU $300_2$, the multiplexing circuit $301_2$, and the second image processing circuit $309_2$ of the second LSI $202_2$ are the same as the configurations of the CPU $300_1$, the multiplexing circuit $301_1$, and the first image processing circuit $309_1$ of the first LSI $202_1$. Furthermore, the configurations of the memory controller $303_2$, and the conveyance mechanism control circuit $305_2$ of the second LSI $202_2$ are the same as the configurations of the memory controller $303_1$, and the conveyance mechanism control circuit $305_1$ of the first LSI $202_1$. Furthermore, the configurations of the first serial IF circuit $306_2$, the second serial IF circuit $307_2$, and the communication IF circuit $308_2$ of the second LSI $202_2$ are the same as the configurations of the first serial IF circuit $306_1$, the second serial IF circuit $307_1$, and the communication IF circuit $308_1$ of the first LSI $202_1$. The second LSI $202_2$ may be a SoC in which these constituent elements $300_2$ to $309_2$ are integrated on the same semiconductor chip.

The CPU $300_2$ controls the operations of the units $301_2$ to $308_2$ inside the second LSI $202_2$. The multiplexing circuit $301_2$ multiplexes image signals of the rear surface of a document that are output from the second imaging unit $120_2$ and inputs the multiplexed image signals to the sixth image processing circuit $302_2$.

The sixth image processing circuit $302_2$ stores, in the second memory $203_2$, third image data obtained from the image signals received from the multiplexing circuit $301_2$. The sixth image processing circuit $302_2$ may carry out predetermined image processing on the third image data. This predetermined image processing may be, for example, shading processing, gamma correction processing, or clipping processing to cut out a document region by removing a background region. Furthermore, part of or the entirety of this image processing may be carried out by the seventh image processing circuit $304_2$. The memory controller $303_2$ controls the write operation of data to the second memory $203_2$ and the read operation of data from the second memory $203_2$.

The seventh image processing circuit $304_2$ generates fourth image data by carrying out first image processing on the third image data stored in the second memory $203_2$. The seventh image processing circuit $304_2$ writes the fourth image data to the second memory $203_2$, separate from the third image data. The conveyance mechanism control circuit $305_2$ generates a drive signal for conveying a document by driving the conveyance mechanism 110, in accordance with an instruction from the CPU $300_2$.

The first serial IF circuit $306_2$ carries out serial communication processing between the second LSI $202_2$ and the third LSI $202_3$. The first serial IF circuit $306_2$ cooperates with a second serial IF circuit $307_3$ of the third LSI $202_3$ which is described hereafter, to carry out DMA transfer to transfer the third image data and the fourth image data from the second memory $203_2$ to the third memory $203_3$. The first serial IF circuit $306_2$ includes a DMAC $320_2$ for controlling the DMA transfer.

Similar to the first serial IF circuit $306_2$, the second serial IF circuit $307_2$ includes a DMAC $321_2$. In the operations described in the present specification, the second serial IF circuit $307_2$ and the communication IF circuit $308_2$ are not used. The second serial IF circuit $307_2$ and the communication IF circuit $308_2$ may be used in other operations of the image data processing device 200 that are not mentioned in the present specification.

Figure 6:
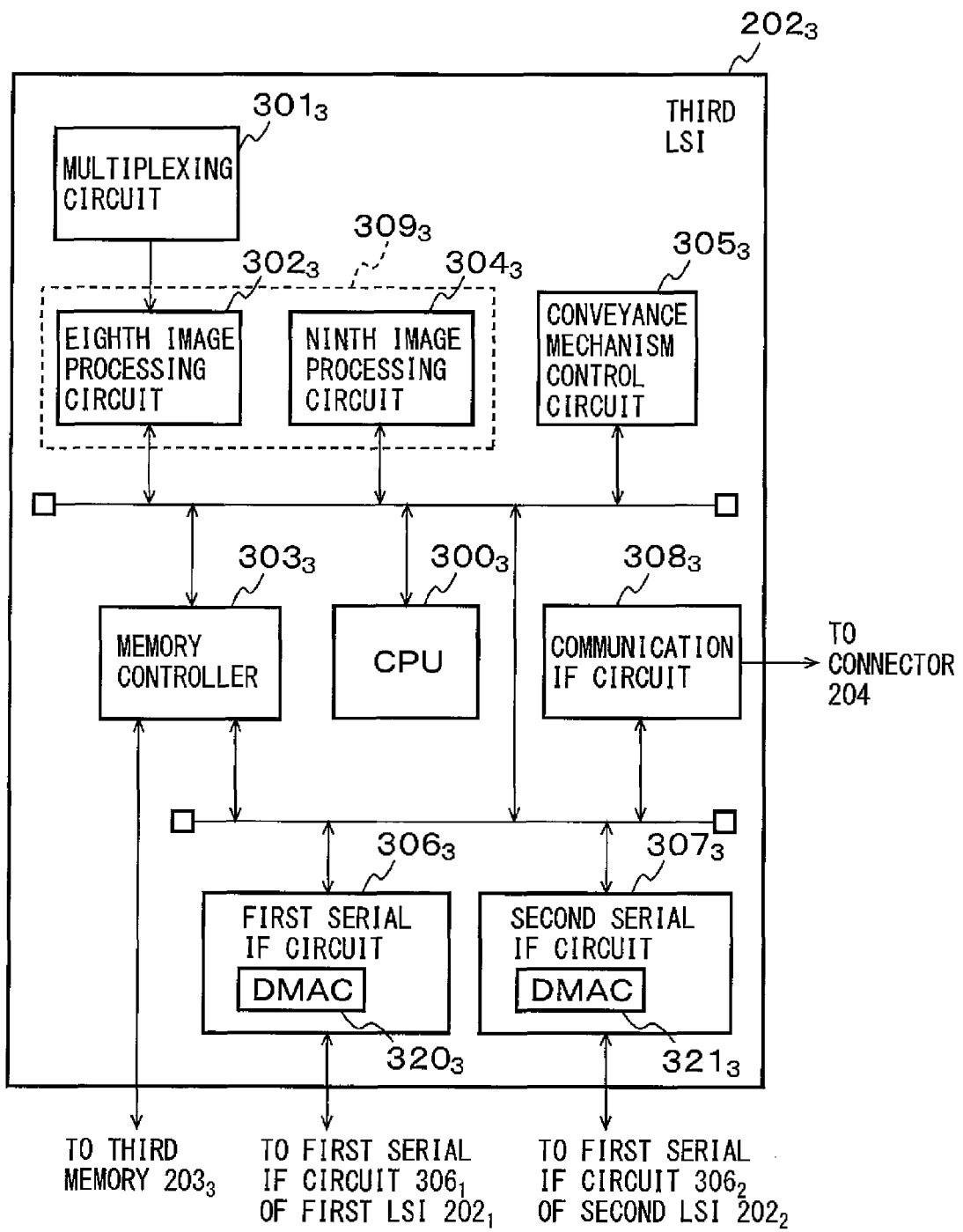
FIG. 6 is a drawing for illustrating an example of a configuration of a third LSI $202_3$.

FIG. 6 is a drawing for illustrating an example of a configuration of the third LSI $202_3$. The third LSI $202_3$ includes a CPU $300_3$, a multiplexing circuit $301_3$, an third image processing circuit $309_3$, a memory controller $303_3$, and a conveyance mechanism control circuit $305_3$. Furthermore, the third LSI $202_3$ includes a first serial IF circuit $306_3$, a second serial IF circuit $307_3$, and a communication IF circuit $308_3$. The third image processing circuit $309_3$ includes an eighth image processing circuit $302_3$, and a ninth image processing circuit $304_3$.

The configurations of the CPU $300_3$, the multiplexing circuit $301_3$, and the third image processing circuit $309_3$ of the third LSI $202_3$ are the same as the configurations of the CPU $300_1$, the multiplexing circuit $301_1$, and the first image processing circuit $309_1$ of the first LSI $202_1$. Furthermore, the configurations of the memory controller $303_3$, and the conveyance mechanism control circuit $305_3$ of the third LSI $202_3$ are the same as the configurations of the memory controller $303_1$, the and the conveyance mechanism control circuit $305_1$ of the first LSI $202_1$. Furthermore, the configurations of the first serial IF circuit $306_3$, the second serial IF circuit $307_3$, and the communication IF circuit $308_3$ of the third LSI $202_3$ are the same as the configurations of the first serial IF circuit $306_1$, the second serial IF circuit $307_1$, and the communication IF circuit $308_1$ of the first LSI $202_1$. The third LSI $202_3$ may be a SoC in which these constituent elements $300_3$ to $309_3$ are integrated on the same semiconductor chip.

The CPU $300_3$ controls the operations of the units $301_3$ to $308_3$ inside the third LSI $202_3$. Furthermore, the CPU $300_3$ controls the document conveyance operations carried out by the first LSI $202_1$ and the second LSI $202_2$. Furthermore, the CPU $300_3$ issues a DMA transfer request for the first image data and the second image data, to the first serial IF circuit $306_1$ of the first LSI $202_1$. The CPU $300_3$ issues a DMA transfer request for the third image data and the fourth image data, to the first serial IF circuit $306_2$ of the second LSI $202_2$.

In the operations described in the present specification, the multiplexing circuit $301_3$, the eighth image processing circuit $302_3$, and the transfer mechanism control circuit $305_3$ are not used. The multiplexing circuit $301_3$, the eighth image processing circuit $302_3$, and the transfer mechanism control circuit $305_3$ may be used in other operations of the image data processing device 200 that are not mentioned in the present specification.

The first serial IF circuit $306_3$ carries out serial communication processing between the first LSI $202_1$ and the third LSI $202_3$. The first serial IF circuit $306_3$ cooperates with the first serial IF circuit $306_1$ of the first LSI $202_1$, to carry out DMA transfer to transfer the first image data and the second image data from the first memory $203_1$ to the third memory $203_3$. The first serial IF circuit $306_3$ includes a DMAC $320_3$ for controlling the DMA transfer.

The second serial IF circuit $307_3$ carries out serial communication processing between the second LSI $202_2$ and the third LSI $202_3$. The second serial IF circuit $307_2$ cooperates with the first serial IF circuit $306_2$ of the second LSI $202_2$, to carry out DMA transfer to transfer the third image data and the fourth image data from the second memory $203_2$ to the third memory $203_3$. The second serial IF circuit $307_3$ includes a DMAC $321_3$ for controlling the DMA transfer.

The ninth image processing circuit $304_3$ carries out second image processing on the first image data and the third image data stored in the third memory $203_3$, and thereby respectively generates fifth image data and sixth image data therefrom.

The communication IF circuit $308_3$ is an interface circuit for carrying out communication processing between the third LSI $202_3$ and a device external to the image data processing device 200. The communication IF circuit $308_3$ may be a wired communication interface circuit such as a USB (Universal Serial Bus) interface, for example. The communication IF circuit $308_3$ transmits and receives signals with a device external to the image data processing device 200, via the connector 204. In another exemplary embodiment, the communication IF circuit $308_3$ may also be a wireless communication interface. The CPU $300_3$ controls the communication IF circuit $308_3$ to output the second image data, the fourth image data, the fifth image data, and the sixth image data.

Figure 7:
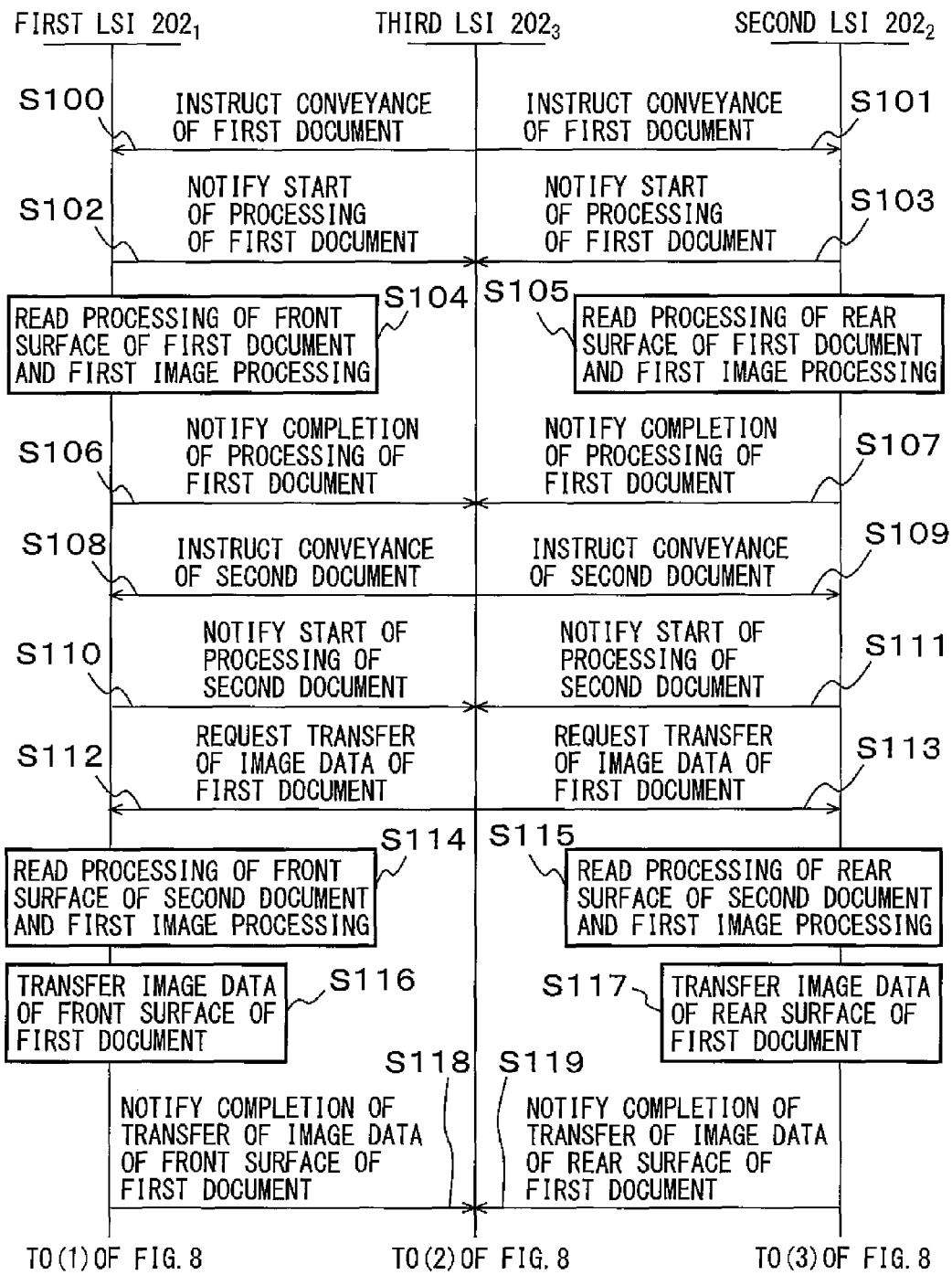
FIG. 7 is a drawing for illustrating an example of the operation of an image data processing device 200.
Figure 8:
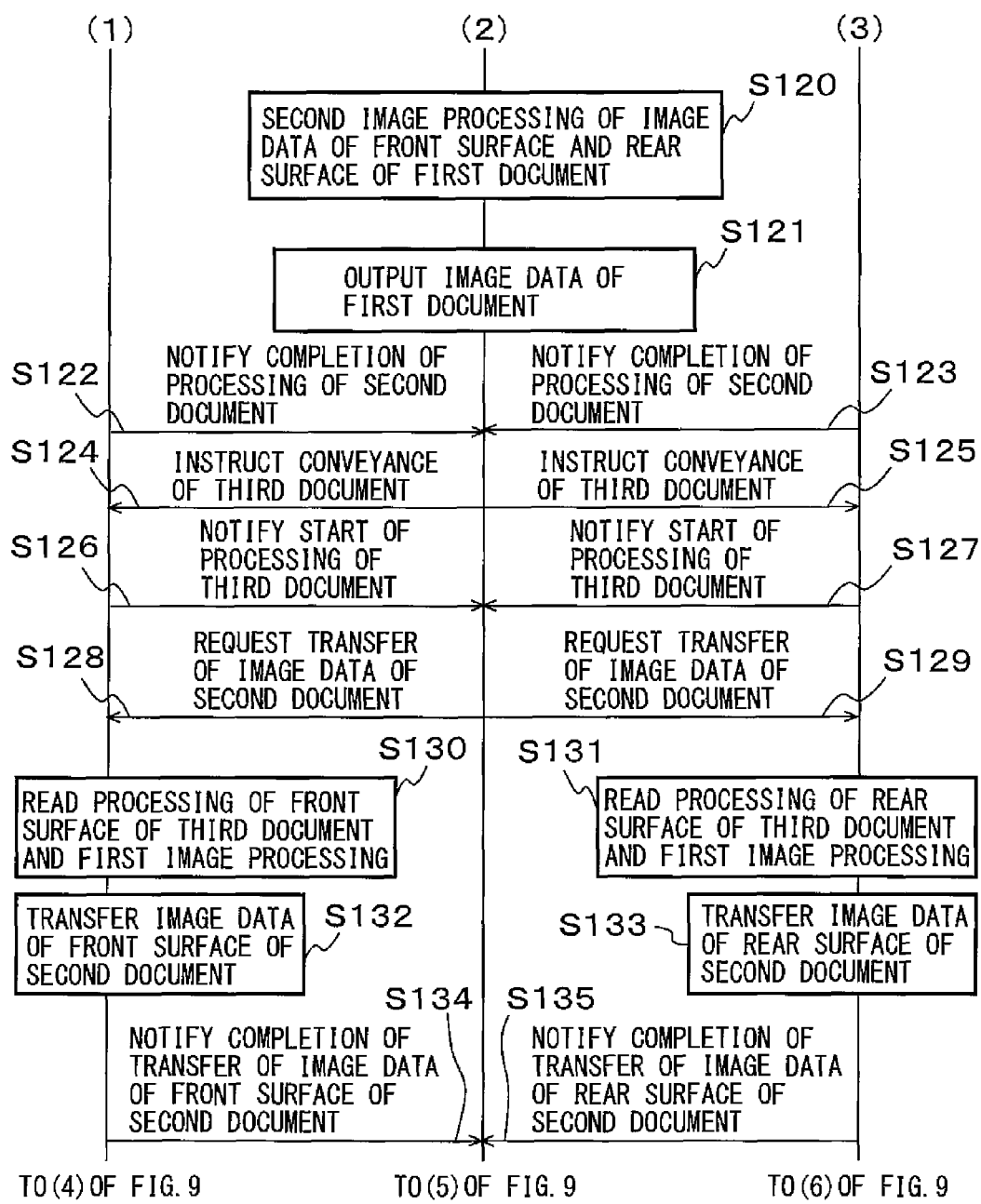
FIG. 8 is a drawing for illustrating an example of the operation of the image data processing device 200.
Figure 9:
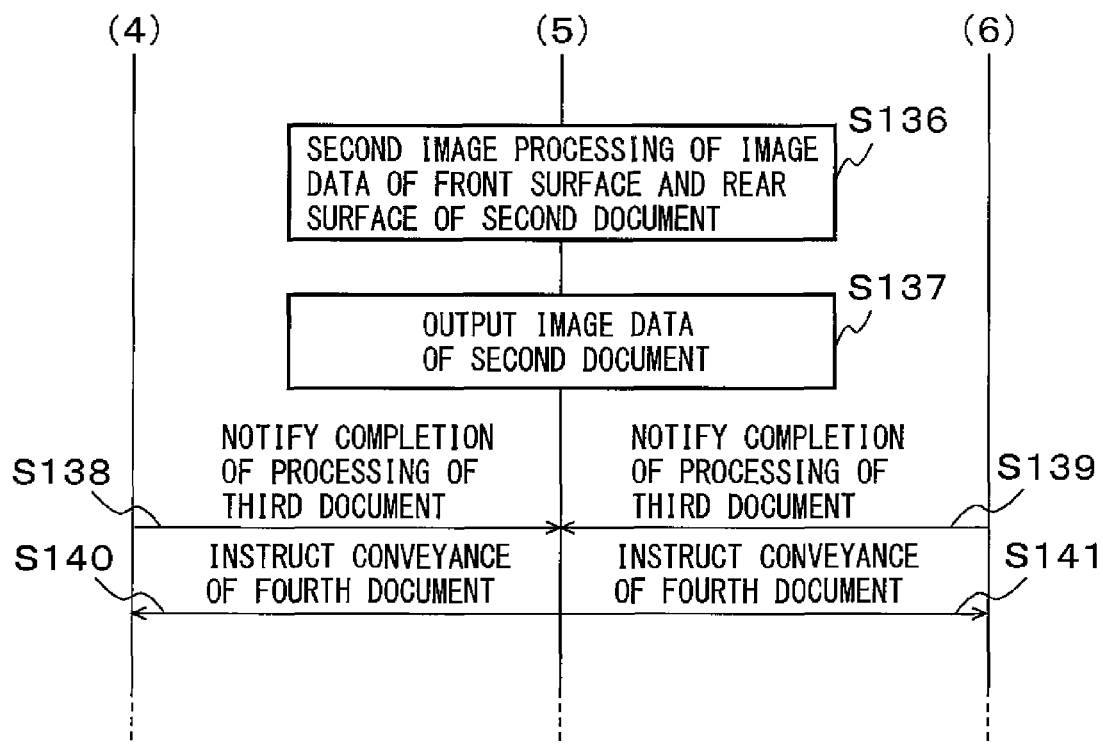
FIG. 9 is a drawing for illustrating an example of the operation of the image data processing device 200.

FIG. 7 to FIG. 9 are drawings for illustrating an example of the operation of the image data processing device 200. In step S100, the third LSI $202_3$ issues an instruction to the first LSI $202_1$ for the conveyance of a first document. In step S101, the third LSI $202_3$ issues an instruction to the second LSI $202_2$ for the conveyance of the first document. Steps S100 and S101 correspond to the processing carried out by the CPU $300_3$.

The CPUs $300_1$ and $300_2$ of the first LSI $202_1$ and second LSI $202_2$ that have received the conveyance instructions cooperate to respectively control the conveyance mechanism control circuits $305_1$ and $305_2$, and start conveyance of the first document. In step S102, the first LSI $202_1$ notifies the third LSI $202_3$ of the start of processing for the first document. Step S102 corresponds to the processing carried out by the CPU $300_1$. In step S103, the second LSI $202_2$ notifies the third LSI $202_3$ of the start of processing for the first document. Step S103 corresponds to the processing carried out by the CPU $300_2$.

In step S104, the first LSI $202_1$ reads original image data (first image data) of the front surface of the first document output from the first imaging unit $120_1$, and stores this data in the first memory $203_1$. The first LSI $202_1$ carries out first image processing for the first image data to generate second image data, and stores the second image data in the first memory $203_1$. Step S104 corresponds to the processing carried out by the fourth image processing circuit $302_1$ and the fifth image processing circuit $304_1$.

In step S105, the second LSI $202_2$ reads original image data (third image data) of the rear surface of the first document output from the second imaging unit $120_2$, and stores this data in the second memory $203_2$. The second LSI $202_2$ carries out first image processing for the third image data to generate fourth image data, and stores the fourth image data in the second memory $203_2$. Step S105 corresponds to the processing carried out by the sixth image processing circuit $302_2$ and the seventh image processing circuit $304_2$.

In step S106, the first LSI $202_1$ notifies the third LSI $202_3$ that the processing for the first document has been completed. Step S106 corresponds to the processing carried out by the CPU $300_1$. In step S107, the second LSI $202_2$ notifies the third LSI $202_3$ that the processing for the first document has been completed. Step S107 corresponds to the processing carried out by the CPU $300_2$.

When completion of the processing for the first document is notified, in step S108 the third LSI $202_3$ issues an instruction to the first LSI $202_1$ for the conveyance of a second document. In step S109, the third LSI $202_3$ issues an instruction to the second LSI $202_2$ for the conveyance of the second document. Steps S108 and S109 correspond to the processing carried out by the CPU $300_3$.

The CPUs $300_1$ and $300_2$ of the first LSI $202_1$ and second LSI $202_2$ that have received the conveyance instructions cooperate to respectively control the conveyance mechanism control circuits $305_1$ and $305_2$, and start conveyance of the second document. In steps S110 and S111, the first LSI $202_1$ and the second LSI $202_2$ notify the third LSI $202_3$ of the start of processing for the second document. Steps S110 and S111 correspond to the processing carried out by the CPU $300_1$ and the CPU $300_2$, respectively.

In step S112, the third LSI $202_3$ instructs the first LSI $202_1$ to carry out DMA transfer to transfer the first image data and the second image data of the first document, from the first memory $203_1$ to the third memory $203_3$. In step S113, the third LSI $202_3$ instructs the second LSI $202_2$ to carry out DMA transfer to transfer the third image data and the fourth image data of the first document, from the second memory $203_2$ to the third memory $203_3$. Steps S112 and S113 correspond to the processing carried out by the CPU $300_3$.

In step S114, the first LSI $202_1$ reads original image data (first image data) of the front surface of the second document output from the first imaging unit $120_1$, and stores this data in the first memory $203_1$. The first LSI $202_1$ carries out first image processing for the first image data to generate second image data, and stores the second image data in the first memory $203_1$. Step S114 corresponds to the processing carried out by the fourth image processing circuit $302_1$ and the fifth image processing circuit $304_1$.

In step S115, the second LSI $202_2$ reads original image data (third image data) of the rear surface of the second document output from the second imaging unit $120_2$, and stores this data in the second memory $203_2$. The second LSI $202_2$ carries out first image processing for the third image data to generate fourth image data, and stores the fourth image data in the second memory $203_2$. Step S115 corresponds to the processing carried out by the sixth image processing circuit $302_2$ and the seventh image processing circuit $304_2$.

In step S116, the first LSI $202_1$ and the third LSI $202_3$ transfer the first image data and the second image data of the first document by means of DMA transfer from the first memory $203_1$ to the third memory $203_3$, parallel with the processing carried out in step S114. Step S116 corresponds to the processing carried out by the first serial IF circuit $306_1$ and the first serial IF circuit $306_3$.

In step S117, the second LSI $202_2$ and the third LSI $202_3$ transfer the third image data and the fourth image data of the first document by means of DMA transfer from the second memory $203_2$ to the third memory $203_3$, parallel with the processing carried out in step S115. Step S117 corresponds to the processing carried out by the first serial IF circuit $306_2$ and the second serial IF circuit $307_3$.

In step S118, the first LSI $202_1$ notifies the third LSI $202_3$ that the DMA transfer of the first image data and the second image data of the first document has been completed. Step S118 corresponds to the processing carried out by the first serial IF circuit $306_1$. The CPU $300_3$ of the third LSI $202_3$ receives the notification of the completion of the DMA transfer of the first image data and the second image data.

In step S119, the second LSI $202_2$ notifies the third LSI $202_3$ that the DMA transfer of the third image data and the fourth image data of the first document has been completed. Step S119 corresponds to the processing carried out by the first serial IF circuit $306_2$. The CPU $300_3$ of the third LSI $202_3$ receives the notification of the completion of the DMA transfer of the third image data and fourth image data.

In step S120, the third LSI $202_3$ carries out second image processing for the first image data and the third image data transferred to the third memory $203_3$ and respectively generates fifth image data and sixth image data, parallel with the processing carried out in steps S114 and S115. In other words, the processing for the first document carried out by the third LSI $202_3$ is executed in a period that overlaps with the period in which the processing of the second document is carried out by the first LSI $202_1$ and the second LSI $202_2$. Step S120 corresponds to the processing carried out by the ninth image processing circuit $304_3$.

In step S121, the third LSI $202_3$ outputs the second image data, fourth image data, fifth image data, and sixth image data, by way of the communication IF circuit $308_3$. Step S121 corresponds to the processing carried out by the CPU $300_3$.

In step S122, the first LSI $202_1$ notifies the third LSI $202_3$ that processing for the second document has been completed. Step S122 corresponds to the processing carried out by the CPU $300_1$. In step S123, the second LSI $202_2$ notifies the third LSI $202_3$ that processing for the second document has been completed. Step S123 corresponds to the processing carried out by the CPU $300_2$.

When completion of the processing for the second document is notified, in step S124 the third LSI $202_3$ issues an instruction to the first LSI $202_1$ for the conveyance of a third document. In step S125, the third LSI $202_3$ issues an instruction to the second LSI $202_2$ for the conveyance of the third document. Steps S124 and S125 correspond to the processing carried out by the CPU $300_3$.

The CPUs $300_1$ and $300_2$ of the first LSI $202_1$ and second LSI $202_2$ that have received the conveyance instructions cooperate to respectively control the conveyance mechanism control circuits $305_1$ and $305_2$, and start conveyance of the third document. In steps S126 and S127, the first LSI $202_1$ and the second LSI $202_2$ notify the third LSI $202_3$ of the start of processing of the third document. Steps S126 and S127 correspond to the processing carried out by the CPU $300_1$ and the CPU $300_2$, respectively.

In step S128, the third LSI $202_3$ instructs the first LSI $202_1$ to carry out DMA transfer to transfer the first image data and the second image data of the second document, from the first memory $203_1$ to the third memory $203_3$. In step S129, the third LSI $202_3$ instructs the second LSI $202_2$ to carry out DMA transfer to transfer the third image data and the fourth image data of the second document, from the second memory $203_2$ to the third memory $203_3$. Steps S128 and S129 correspond to the processing carried out by the CPU $300_3$.

In step S130, the first LSI $202_1$ reads original image data (first image data) of the front surface of the third document output from the first imaging unit $120_1$, and stores this data in the first memory $203_1$. The first LSI $202_1$ carries out first image processing for the first image data to generate second image data, and stores the second image data in the first memory $203_1$. Step S130 corresponds to the processing carried out by the fourth image processing circuit $302_1$ and the fifth image processing circuit $304_1$.

In step S131, the second LSI $202_2$ reads original image data (third image data) of the rear surface of the third document output from the second imaging unit $120_2$, and stores this data in the second memory $203_2$. The second LSI $202_2$ carries out first image processing for the third image data to generate fourth image data, and stores the fourth image data in the second memory $203_2$. Step S131 corresponds to the processing carried out by the sixth image processing circuit $302_2$ and the seventh image processing circuit $304_2$.

In step S132, the first LSI $202_1$ and the third LSI $202_3$ transfer the first image data and the second image data of the second document by means of DMA transfer from the first memory $203_1$ to the third memory $203_3$, parallel with the processing carried out in step S130. Step S132 corresponds to the processing carried out by the first serial IF circuit $306_1$ and the first serial IF circuit $306_3$.

In step S133, the second LSI $202_2$ and the third LSI $202_3$ transfer the third image data and the fourth image data of the second document by means of DMA transfer from the second memory $203_2$ to the third memory $203_3$, parallel with the processing carried out in step S131. Step S133 corresponds to the processing carried out by the first serial IF circuit $306_2$ and the second serial IF circuit $307_3$.

In step S134, the first LSI $202_1$ notifies the third LSI $202_3$ that the DMA transfer of the first image data and the second image data of the second document has been completed. Step S134 corresponds to the processing carried out by the first serial IF circuit $306_1$. The CPU $300_3$ of the third LSI $202_3$ receives the notification of the completion of the DMA transfer of the first image data and the second image data.

In step S135, the second LSI $202_2$ notifies the third LSI $202_3$ that the DMA transfer of the third image data and the fourth image data of the second document has been completed. Step S135 corresponds to the processing carried out by the first serial IF circuit $306_2$. The CPU $300_3$ of the third LSI $202_3$ receives the notification of the completion of the DMA transfer of the third image data and fourth image data.

In step S136, the third LSI $202_3$ carries out second image processing for the first image data and the third image data transferred to the third memory $203_3$ and respectively generates fifth image data and sixth image data, parallel with the processing carried out in steps S130 and S131. In other words, the processing for the second document carried out by the third LSI $202_3$ is executed in a period that overlaps with the period in which the processing of the third document is carried out by the first LSI $202_1$ and the second LSI $202_2$. Step S136 corresponds to the processing carried out by the ninth image processing circuit $304_3$.

In step S137, the third LSI $202_3$ outputs the second image data, fourth image data, fifth image data, and sixth image data, by way of the communication IF circuit $308_3$. Step S137 corresponds to the processing carried out by the CPU $300_3$.

In step S138, the first LSI $202_1$ notifies the third LSI $202_3$ that the processing for the third document has been completed. Step S138 corresponds to the processing carried out by the CPU $300_1$. In step S139, the second LSI $202_2$ notifies the third LSI $202_3$ that the processing for the third document has been completed. Step S139 corresponds to the processing carried out by the CPU $300_2$.

When completion of the processing for the third document is notified, in step S140 the third LSI $202_3$ issues an instruction to the first LSI $202_1$ for the conveyance of a fourth document. In step S141, the third LSI $202_3$ issues an instruction to the second LSI $202_2$ for the conveyance of the fourth document. Steps S140 and S141 correspond to the processing carried out by the CPU $300_3$.

Hereafter, the same read processing is carried out also for the remaining fourth document and documents thereafter that are placed on the document tray 103, and in a period that overlaps with the period in which the first LSI $202_1$ and the second LSI $202_2$ process an $n^{th}$ document, the third LSI $202_3$ processes the $(n-1)^{th}$ document.

Figure 10:
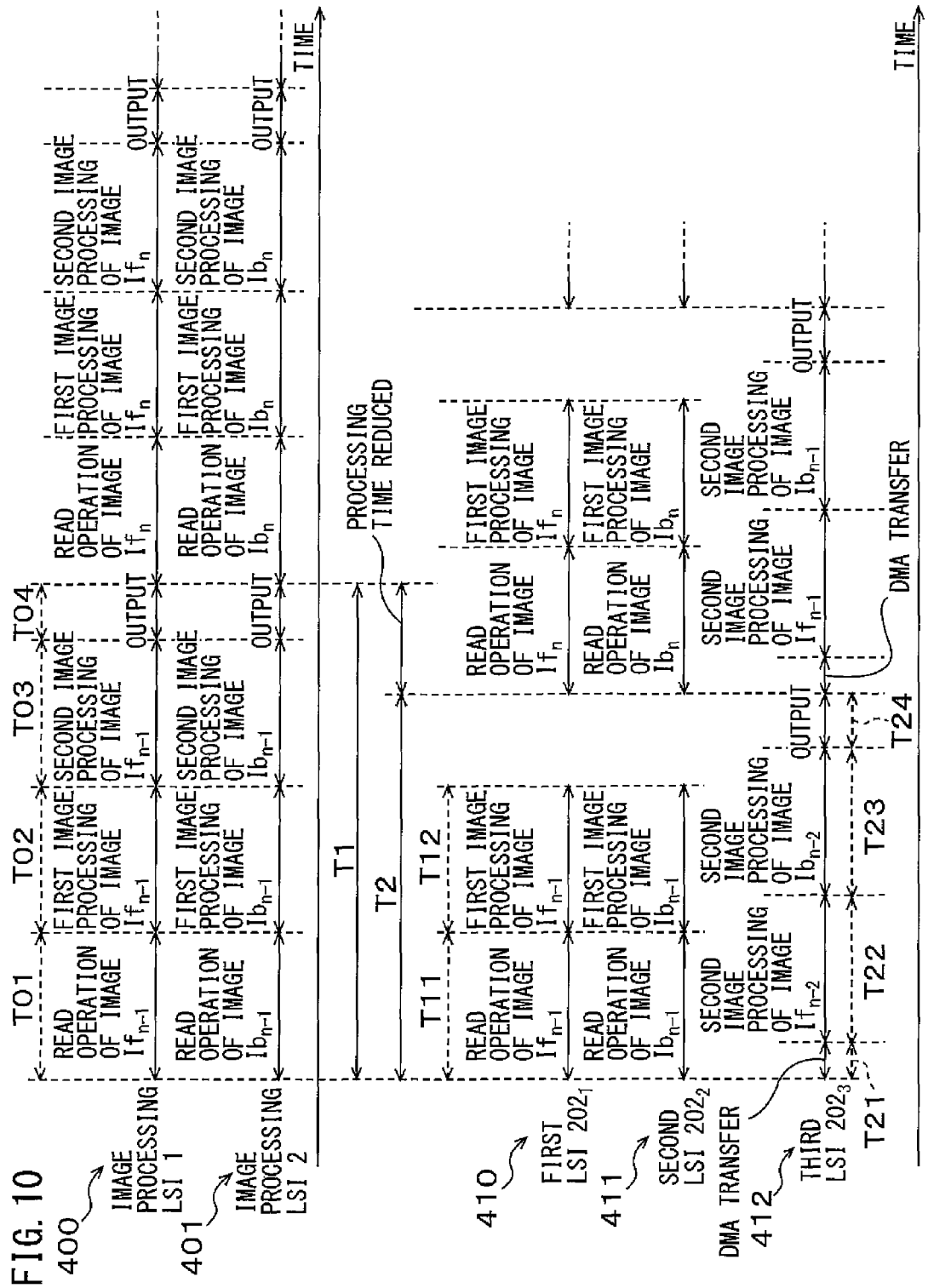
FIG. 10 is a time chart for illustrating an example of the operation of the image data processing device 200.

FIG. 10 is a time chart for illustrating an example of the operation of an image data processing device 200. Reference arrows 400 and 401 indicate, for comparison purposes, a time chart for the case where first image processing and second image processing are executed by the same LSI. An image processing LSI 1 controls a read operation for an image of the front surface of a document, carries out first image processing and second image processing of the image of the front surface of the document, and outputs image data obtained as a result of the first image processing and the second image processing. An image processing LSI 2 controls a read operation of an image of the rear surface of the document, carries out first image processing and second image processing of the image of the rear surface of the document, and outputs image data obtained as a result of the first image processing and the second image processing.

It is to be noted that, in the following description and FIG. 10, the original image data of the front surface of the $(n-2)^{th}$, $(n-1)^{th}$, and $n^{th}$ documents are referred to as images $If_{n-2}$, and $If_{n-2}$, and $If_n$, respectively. The original image data of the rear surface of the $(n-2)^{th}$, $(n-1)^{th}$, and $n^{th}$ documents are referred to as images $Ib_{n-2}$, $Ib_{n-1}$, and $Ib_{n-1}$, respectively.

The image processing LSI 1 sequentially executes control of a read operation for the image $If_{n-1}$ of the front surface of the $(n-1)^{th}$ document, first image processing of the image $If_{n-1}$, second image processing of the image $If_{n-1}$, and output of image data during periods T01 to T04, respectively. Similarly, the image processing LSI 2 also sequentially executes control of a read operation for the image $Ib_{n-1}$ of the rear surface of the $(n-1)^{th}$ document, first image processing of the image $Ib_{n-1}$, second image processing of the image and output of image data during periods T01 to T04, respectively. As a result, the period in which one document is processed is period T1, which is the total of the periods T01 to T04.

The reference arrows 410, 411, and 412 are time charts of the operations of the first LSI $202_1$, the second LSI $202_2$, and the third LSI $202_3$, respectively. The first LSI $202_1$ executes the control for the read operation of the image $If_{n-1}$ of the front surface of the $(n-1)^{th}$ document and the first image processing of the image $If_{n-1}$ during the periods T11 and T12, respectively. Similarly, the second LSI $202_2$ also executes the control for the read operation of the image $Ib_{n-1}$ of the rear surface of the $(n-1)^{th}$ document and the first image processing of the image during the periods T11 and T12, respectively.

On the other hand, the images $If_{n-2}$ and $Ib_{n-2}$ of the $(n-2)^{th}$ document read in prior to the $(n-1)^{th}$ document are DMA transferred to the third memory $203_3$ during the period T21 that overlaps with the periods T11 and T12. The third LSI $202_3$ executes second image processing for the image $If_{n-2}$ of the front surface of the $(n-2)^{th}$ document and for the image $Ib_{n-2}$ of the rear surface, during the periods T22 and T23 which overlap with the periods T11 and T12. Thereafter, in the period T24, the third LSI $202_3$ outputs the image data of the $(n-2)^{th}$ document.

In the case where the total processing time for one document by the third LSI $202_3$ is greater than the total processing time for one document by the first LSI $202_1$ or the second LSI $202_2$, the processing period per one document of the image data processing device 200 becomes the period T2 which is the total of the periods T21 to T24.

Since the time it takes to transfer data by DMA transfer is particularly short compared to the time for an image read operation or image processing, the period T21 for DMA transfer is particularly short compared to other periods T11, T12, T22, and T23. Furthermore the image data output periods T04 and T24 can be assumed to be the same length. Accordingly, if the period for second image processing of two single-side surfaces of the document is shorter than the period for a read operation, first image processing, and second image processing of one single-side surface of the document, the processing time is shorter than in the case where first image processing and second image processing are executed by the same LSI.

In the case where the total processing time for one document by the first LSI $202_1$ or the second LSI $202_2$ is greater than the total processing time for one document by the third LSI $202_3$, the processing period per one document becomes the period T2 which is the total of the periods T11 to T12. In this case, since the third LSI $202_3$ carries out second image processing and output, it is clear that the processing time is shortened.

In this way, according to the present exemplary embodiment, the third LSI $202_3$ carries out second image processing for the $(n-1)^{th}$ document in a period that overlaps with the period in which the first LSI $202_1$ and the second LSI $202_2$ carry out control of the read operation for the $n^{th}$ document and first image processing. As a result of this, the processing time can be made shorter than when control for the read operation of a document, first image processing, and second image processing are sequentially executed by a single integrated circuit.

Furthermore, the image data processing device 200 of the present exemplary embodiment includes memories $203_1$ to $203_3$ that can be independently accessed by the plurality of LSIs $202_1$ to $202_3$, and a DMAC that carries out DMA transfer between the memories $203_1$ to $203_3$. Therefore, there is a reduction in the concentration in access from the plurality of integrated circuits with respect to the same memory.

Figure 11:
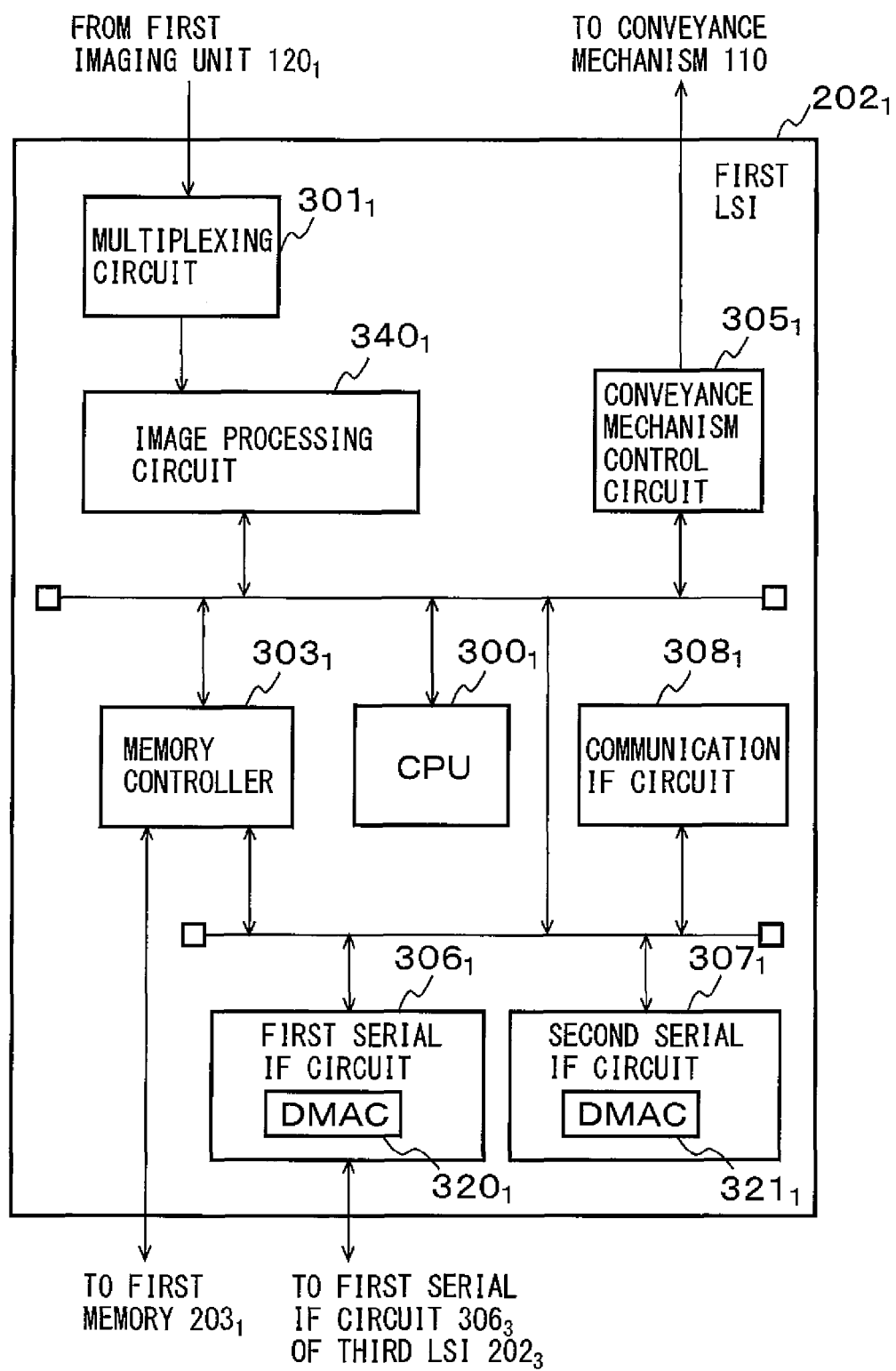
FIG. 11 is a drawing for illustrating another exemplary configuration for the configuration of the first LSI $202_1$.

Next, another exemplary embodiment of the first LSI $202_1$ to the third LSI $202_3$ is described. FIG. 11 is a drawing for illustrating another exemplary configuration for the configuration of the first LSI $202_1$. The first LSI $202_1$ includes a single image processing circuit $340_1$ that executes the aforementioned processing of the fourth image processing circuit $302_1$ and the fifth image processing circuit $304_1$. The image processing circuit $340_1$ may carry out the processing of the fourth image processing circuit $302_1$ and the fifth image processing circuit $304_1$ by using the same circuits or circuits that at least partially overlap.

The circuit scale can be reduced by executing the processing of the fourth image processing circuit $302_1$ and the fifth image processing circuit $304_1$ by means of the single image processing circuit $340_1$.

In the same way as the second LSI $202_2$, a single image processing circuit that executes the processing of the sixth image processing circuit $302_2$ and the seventh image processing circuit 304₂ may be provided. In the same way as the third LSI 202₃, a single image processing circuit that executes the processing of the eighth image processing circuit 302₃ and the ninth image processing circuit 304₃ may be provided.

The device, and apparatus disclosed in this specification have at least one of the following effects.

(1) There is a reduction in the increase in processing time that occurs when additional image processing is carried out in addition to certain image processing, with respect to each of a plurality of image data items.

(2) There is a reduction in the concentration in memory access caused by a plurality of integrated circuits accessing shared memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image data processing device comprising:
   a first integrated circuit, a second integrated circuit, and a third integrated circuit; and
   a first memory capable of being accessed by the first integrated circuit, a second memory capable of being accessed by the second integrated circuit, and a third memory capable of being accessed by the third integrated circuit,
   wherein, the first integrated circuit includes: a first image processing circuit capable of read and write processing of image data to the first memory, and first image processing for image data stored in the first memory; and a first serial interface capable of direct memory access transfer of image data between the first memory and the third memory,
   and wherein, the second integrated circuit includes: a second image processing circuit capable of read and write processing of image data to the second memory, and second image processing for image data stored in the second memory; and a second serial interface capable of direct memory access transfer of image data between the second memory and the third memory,
   and wherein, the third integrated circuit includes: a third image processing circuit capable of read and write processing of image data to the third memory, and third image processing for image data stored in the third memory; and a third serial interface capable of direct memory access transfer of image data between the third memory and the first memory, and between the third memory and the second memory.

2. The image data processing device according to claim 1, wherein, the first image processing circuit includes: a fourth image processing circuit capable of reception processing of image data captured by an image sensor, and processing for writing received image data to the first memory; and a fifth image processing circuit capable of the first image processing for image data read from the first memory, and processing for writing image data obtained by the first image processing to the first memory,
   and wherein, the second image processing circuit includes: a sixth image processing circuit capable of reception processing of image data captured by an image sensor, and processing for writing received image data to the second memory; and a seventh image processing circuit capable of the second image processing for image data read from the second memory, and processing for writing image data obtained by the second image processing to the second memory, and
   and wherein, the third image processing circuit includes: an eighth image processing circuit capable of reception processing of image data captured by an image sensor, and processing for writing received image data to the third memory; and a ninth image processing circuit capable of the third image processing for image data read from the third memory, and processing for writing image data obtained by the third image processing to the third memory.

3. The image data processing device according to claim 2, wherein
   the first serial interface and the third serial interface carry out direct memory access transfer to the third memory of first image data written to the first memory by the fourth image processing circuit, and second image data written to the first memory by the fifth image processing circuit,
   the second serial interface and the third serial interface carry out direct memory access transfer to the third memory of third image data written to the second memory by the sixth image processing circuit, and fourth image data written to the second memory by the seventh image processing circuit, and
   the ninth image processing circuit generates fifth image data and sixth image data for which the third image processing is applied to the first image data and the third image data written to the third memory, and writes the fifth image data and the sixth image data to the third memory.

4. The image data processing device according to claim 3, wherein, in a period that overlaps with a period in which image data of an $i^{th}$ document (i being a positive integer) from among a plurality of documents captured in succession by an image sensor is processed by the fourth image processing circuit, the fifth image processing circuit, the sixth image processing circuit, and the seventh image processing circuit, the ninth image processing circuit carries out processing of image data of an $(i-1)^{th}$ document from among the plurality of documents.

5. The image data processing device according to claim 3, wherein
   the first image processing is processing for converting the first image data to the second image data with a first image format,
   the second image processing is processing for converting the third image data to the fourth image data with the first image format, and
   the third image processing is processing for respectively converting the first image data and the third image data to the fifth image data and the sixth image data with a second image format different from the first image format.

6. The image data processing device according to claim 3, wherein
   each of the first integrated circuit, the second integrated circuit, and the third integrated circuit includes a communication interface capable of output processing of image data read from a memory capable of being accessed by each of the first memory, the second memory, and the third memory, respectively, and the communication interface of the third integrated circuit outputs the second image data, the fourth image data, the fifth image data, and the sixth image data written to the third memory.

7. An image reading apparatus comprising:

the image data processing device according to claim 1; and an image sensor for capturing image data to be processed by the image data processing device.

* * * * *